(12) United States Patent
Han et al.

(10) Patent No.: US 7,687,781 B2
(45) Date of Patent: Mar. 30, 2010

(54) EXTERNAL LIGHT SHIELDING FILM AND OPTICAL FILTER FOR DISPLAY APPARATUS HAVING THE SAME

(75) Inventors: Moon Ki Han, Cheongju-si (KR); Seung-Ho Moon, Suwon-si (KR); Duck Ki Ahn, Seoul (KR); In Sung Sohn, Seongnam-si (KR)

(73) Assignee: Samsung Corning Precision Glass Co., Ltd., Gumi (KR)

( * ) Notice: Subject to any disclaimer, the term of this patent is extended or adjusted under 35 U.S.C. 154(b) by 276 days.

(21) Appl. No.: 11/956,496

(22) Filed: Dec. 14, 2007

(65) Prior Publication Data

US 2008/0149865 A1 Jun. 26, 2008

(30) Foreign Application Priority Data

Dec. 22, 2006 (KR) ............... 10-2006-0133186
Aug. 24, 2007 (KR) ............... 10-2007-0085713

(51) Int. Cl.
*H01J 5/16* (2006.01)
*G01N 21/00* (2006.01)
*G02F 1/00* (2006.01)
*G02B 5/22* (2006.01)

(52) U.S. Cl. ............... 250/372; 250/504 R; 250/515.1; 313/112; 359/361; 264/1.38

(58) Field of Classification Search ............... 250/372, 250/504 R, 515, 1; 313/112; 359/361; 264/1.38
See application file for complete search history.

(56) References Cited

U.S. PATENT DOCUMENTS

| 6,864,299 B1 | 3/2005 | Komuro et al. |
| 2006/0145578 A1* | 7/2006 | Park et al. .......... 313/112 |
| 2008/0137222 A1* | 6/2008 | Park et al. .......... 359/885 |
| 2009/0029294 A1* | 1/2009 | Gonda .......... 430/319 |

(Continued)

FOREIGN PATENT DOCUMENTS

CN 180884 A 7/2006

(Continued)

OTHER PUBLICATIONS

European Office Action issued in European Patent Application No. 07254816.7 on Aug. 25, 2008.

(Continued)

*Primary Examiner*—Nikita Wells
(74) *Attorney, Agent, or Firm*—Stein McEwen, LLP

(57) ABSTRACT

Disclosed is an external light shielding film. The external light shielding film comprises a transparent substrate; and an external light shielding pattern formed on a surface of the transparent substrate and including a plurality of external light shielding parts. Each of the plurality of external light shielding parts has a polymer resin and at least one color-changeable colorant. The color of the plurality of external light shielding parts may vary according to an external heat source or vary depending on an intensity of an external light source, thereby improving a contrast ratio in a bright room, and a specific color may be visible even when the power of the display apparatus is OFF, thereby achieving an interior decorative effect.

13 Claims, 3 Drawing Sheets

U.S. PATENT DOCUMENTS

2009/0104412 A1* 4/2009 Han et al. ................ 428/195.1

FOREIGN PATENT DOCUMENTS

| JP | 06-242472 | 9/1994 |
|---|---|---|
| JP | 2000-221675 | 8/2000 |
| JP | 2001-354952 | 12/2001 |
| KR | 10-1999-0070801 | 9/1999 |
| KR | 10-2003-0077422 | 10/2003 |
| KR | 10-2006-0080116 | 7/2006 |

OTHER PUBLICATIONS

Office Action issued by Chinese Intellectual Property Office in Chinese Patent Application No. 2007103020740 on Mar. 13, 2009.

* cited by examiner

EXTERNAL LIGHT SHIELDING FILM AND OPTICAL FILTER FOR DISPLAY APPARATUS HAVING THE SAME

CROSS-REFERENCE TO RELATED APPLICATION

This application claims the benefit of Korean Patent Applications No. 10-2006-0133186, filed on Dec. 22, 2006 and No. 10-2007-0085713, filed on Aug. 24, 2007, in the Korean Intellectual Property Office, the entire disclosure of which is incorporated herein by reference.

BACKGROUND OF THE INVENTION

1. Field of the Invention

The present invention relates to an external light shielding film and an optical filter for a display apparatus having the same, and more particularly, to an external light shielding film and an optical filter for a display apparatus having the same in which a contrast ratio in a bright room is increased, and a color varies depending on ON/OFF of the display apparatus.

2. Description of the Related Art

As modern society becomes more information oriented, technology of parts and devices related to image displays is remarkably advancing, and these parts and devices are becoming widespread. Display apparatuses utilizing parts and devices related to photoelectronics are becoming significantly widespread and used for television apparatuses, monitor apparatuses of personal computers, and the like. Also, display apparatuses are becoming both larger and thinner.

Plasma display panel (PDP) apparatuses are generally gaining popularity as next-generation display apparatuses to simultaneously satisfy a trend of becoming larger, and of becoming thinner, when compared with cathode-ray tubes (CRTs) representing existing display apparatuses. The PDP apparatuses display images using a gas discharge phenomenon, and exhibit superior display characteristics such as display resolution, brightness, contrast ratio, an afterimage, a viewing angle, and the like. Also, since the PDP apparatuses are generally seen as having the most appropriate characteristics for future high-quality digital televisions due to thin luminous display apparatuses of which enlargement is simpler than any other display apparatus, the PDP apparatuses are gaining popularity as display apparatuses and are replacing CRTs.

The PDP apparatus generates a gas discharge between electrodes by a direct current (DC) voltage or an alternating current (AC) voltage which are supplied to the electrodes. Here, ultraviolet light is generated. Then, a phosphor is excited by ultraviolet light, thereby emitting light. However, the PDP apparatus has a defect in that an amount of emitted electromagnetic (EM) radiation and near infrared (NI) radiation with respect to a driving characteristic is great, surface reflectivity of the phosphor is great, and color purity due to orange light emitted from helium (He), or xenon (Xe) used as a sealing gas is lower than the CRT. Accordingly, EM radiation and NI radiation generated in the PDP apparatus may have harmful effects on human bodies, and cause sensitive equipment such as wireless telephones, remote controls, and the like, to malfunction.

Therefore, in order to use the PDP apparatus, it is required to prevent emission of EM radiation and NI radiation emitted from the PDP apparatus from increasing to more than a predetermined level. PDP filters having functions such as an EM radiation-shielding function, an NI radiation-shielding function, a surface antiglare function, enhancement of color purity, and the like, are used for EM radiation-shielding and NI radiation-shielding while simultaneously reducing reflected light, and enhancing color purity.

However, since each functional film realizing the above-described functions which is applied to the PDP filter has a given structure and a given material, optical properties unrelated to external environmental causes are exhibited. As a result, various demands depending on an environment of the display apparatus while in use cannot be satisfied.

SUMMARY OF THE INVENTION

An aspect of the present invention provides an external light shielding film in which flexible optical properties are exhibited according to environmental changes, thereby improving a contrast ratio in a bright room, and a specific color is exhibited even when the power is OFF.

Another aspect of the present invention provides an optical filter for a display apparatus adapting the external light shielding film.

Another aspect of the present invention provides a method of manufacturing an external light shielding film which increases an external light shielding effect, and simplifies the manufacture of the external light shielding film.

According to an aspect of the present invention, there is provided an external light shielding film which comprises a transparent substrate; and an external light shielding pattern formed on a surface of the transparent substrate and including a plurality of external light shielding parts. In this instance, each of the plurality of external light shielding parts has a polymer resin and at least one color-changeable colorant.

Also, the color-changeable colorant may be either a photochromic colorant whose color varies depending on a wavelength of an external light source, or a thermochromic colorant whose color varies depending on an ambient temperature of the colorant.

In this instance, the color-changeable colorant includes at least one colorant selected from the group consisting of spiropyran-based colorants, thionine-based colorants, diarylethene-based colorants, and diazo-based colorants.

Also, the color of the photochromic colorant varies depending on a wavelength of a light in an ultraviolet ray range. Also, the photochromic colorant is irreversibly changed into a black color by irradiation of a light, so that the changed black color is maintained.

Also, each of the plurality of external light shielding parts has a wedge form in its cross-sectional shape, and a stripe form when viewed from the top.

According to another aspect of the present invention, there is provided an optical filter which comprises a plurality of functional films; and an external light shielding film. In this instance, the external light shielding film is disposed between at least two adjacent functional films, and comprises a transparent substrate; and an external light shielding pattern formed on a surface of the transparent substrate and including a plurality of external light shielding parts. Also, each of the plurality of external light shielding parts has a polymer resin and at least one color-changeable colorant.

According to another aspect of the present invention, there is provided a method of manufacturing an external light shielding film, the method comprising: forming a plurality of wedge-shaped grooves on an ultraviolet curable resin film; injecting a resin including a photochromic colorant to the plurality of wedge-shaped grooves; and irradiating an ultraviolet ray to the ultraviolet curable resin film. In this instance, the photochromic colorant is irreversibly changed into a black color by ultraviolet ray, so that the changed black color is maintained.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
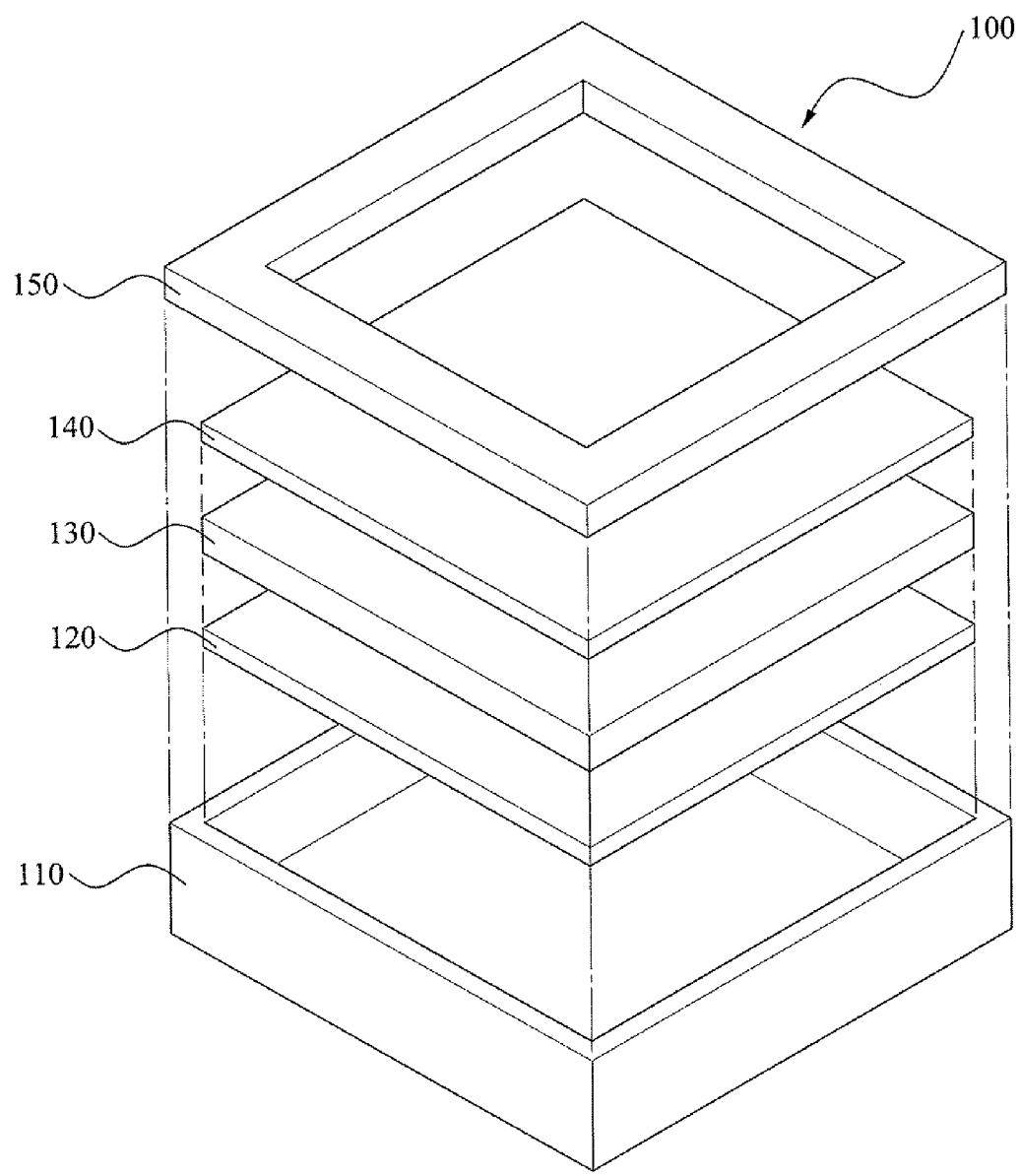
FIG. 1 is an exploded schematic perspective view illustrating a plasma display panel (PDP) apparatus according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is an exploded schematic perspective view illustrating a plasma display panel (hereinafter referred to as 'PDP') apparatus 100 according to an exemplary embodiment of the present invention.

Referring to FIG. 1, the PDP apparatus 100 according to the present exemplary embodiment of the invention includes a case 110, a cover 150 for covering an upper portion of the case 110, a driving circuit board 120 received in the case 110, a panel assembly 130 including light emitting cells where a gas discharge phenomenon occurs, and a PDP filter 140. The PDP filter 140 includes a conductive film formed on a transparent substrate and made of a material having superior conductivity. The conductive layer is grounded to the case 110 via the cover 150. Specifically, an electromagnetic wave generated from the panel assembly 130 is shielded by the cover 150 and the case 110 which are grounded using the conductive layer of the PDP filter 140, before reaching a viewer.

Hereinafter, the PDP filter will be described in detail.

Figure 2:
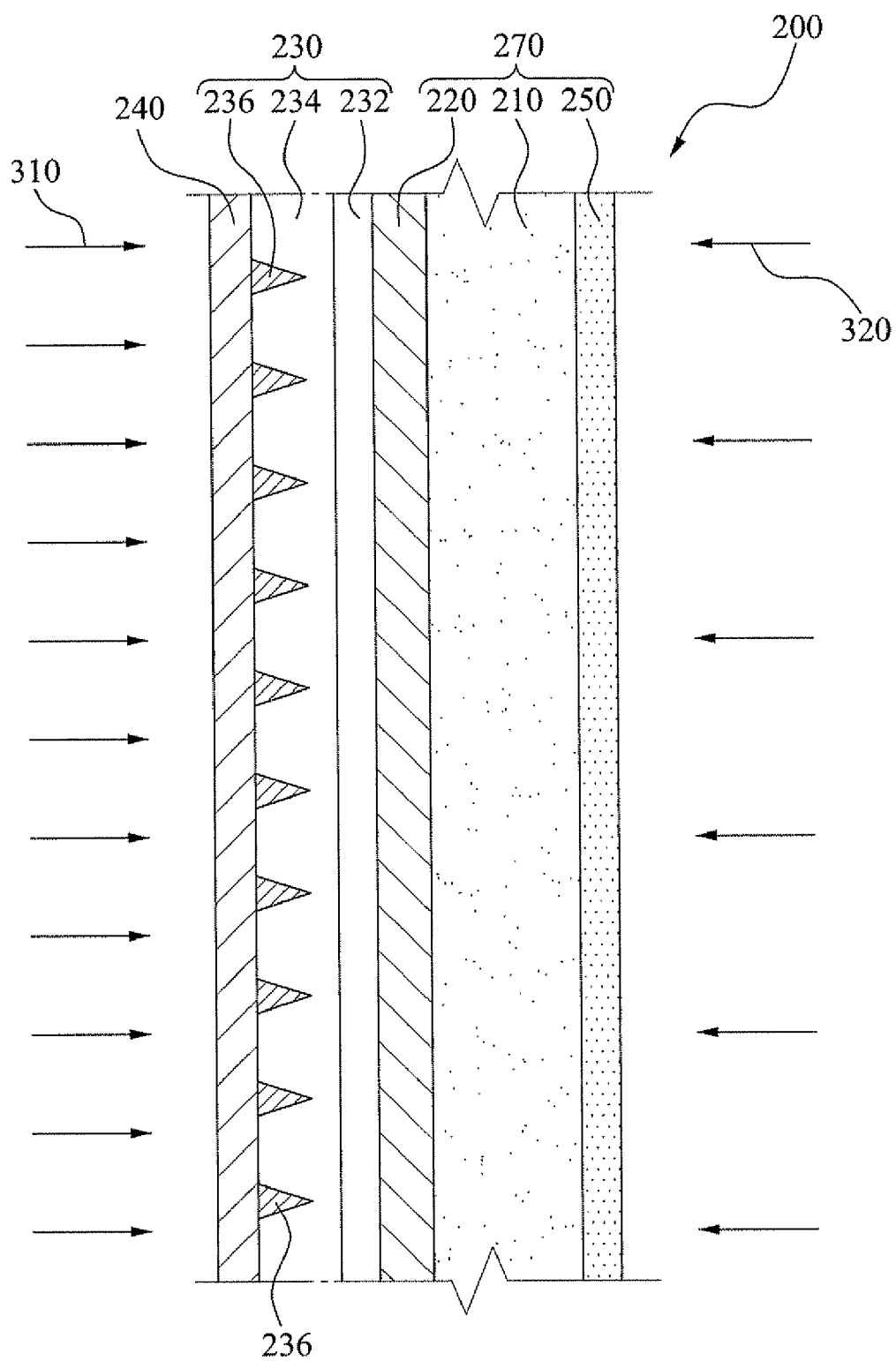
FIG. 2 is a cross-sectional view illustrating a plasma display panel (PDP) filter according to an exemplary embodiment of the present invention.

FIG. 2 is a cross-sectional view illustrating a PDP filter 200 according to an exemplary embodiment of the present invention.

Referring to FIG. 2, the PDP filter 200 according to the present exemplary embodiment of the invention comprises a filter base 270 including films having diverse shielding functions formed on a transparent substrate 210, and an external light shielding film 230.

Here, the filter base 270 is formed of the transparent substrate 210, an anti-reflection film 250, and an electromagnetic wave shielding film 220 stacked one over another regardless of the stated order. Hereinafter, the electromagnetic wave shielding film and the anti-reflection film are separately provided according to the present exemplary embodiment of the invention, however, the present invention is not limited thereto. Specifically, the filter base 270 of the present exemplary embodiment of the invention may be formed of at least one film, and each film may have at least one of an electromagnetic wave function, and an anti-reflection function.

The external light shielding film 230 is disposed on a surface of the filter base 270. Specifically, the external light shielding film 230 is disposed on a surface of the filter base 270 which is present in a side of the panel assembly, that is, a side opposite to a viewer side when the PDP filter 200 is applied to the PDP apparatus, however, the present invention is not limited thereto. Thus, the external light shielding film 230 may be disposed on another surface of the filter base 270.

The external light shielding film 230 includes a support body 232, a substrate 234 disposed on a surface of the support body 232, and an external light shielding pattern 236 for preventing external light 320 entering from the outside into the panel assembly. The external light shielding pattern 236 includes a plurality of external light shielding parts. A unit pattern composed of the external light shielding pattern 236 is hereinafter referred to as an external light shielding part.

The external light shielding pattern 236 of the present exemplary embodiment of the invention is spaced apart from each other by a predetermined distance, thereby forming a plurality of wedge-shaped stripes. Each bottom surface of the plurality of the wedge-shaped stripes is formed on the substrate in such a manner as to face the panel assembly.

Here, the substrate 234 formed with the external light shielding pattern 236 may be directly disposed on the filter base 270. However, as illustrated in FIG. 2, the substrate 234 may be disposed on the support body 232 and then they may be coupled with the filter base 270. Here, the support body 232 functions to support the substrate 234 formed with the external light shielding pattern 236. As illustrated in FIG. 2, the support body 232 permits the substrate 234 and the filter base 270 to be coupled with each other in such a manner as to be situated therebetween, however, the present invention is not limited thereto. Specifically, since the support body 232 functions to support the substrate 234, when the external light shielding film 230 is disposed on another surface of the filter base 270 which is different from the surface facing the panel assembly, the substrate 234 and the filter base 270 are directly coupled with each other without the support body 232 interposed therebetween. An adhesive film 240 is formed on a surface of the external light shielding film 230, thereby allowing the panel assembly and the PDP filter 200 to be adhered with each other. The adhesive film 240 is formed on the PDP filter 200 according to the present exemplary embodiment of the invention, however, the present invention is not limited thereto.

Also, the external light shielding part (unit pattern) has a wedge form in its cross-sectional shape, and a plurality of stripe-shaped patterns (external light shielding parts) are formed on a surface of the substrate 234 facing the panel assembly (not shown) in such a manner as to be spaced apart from one other by a predetermined distance, thereby preventing the external light 320 from entering into the inside of the panel assembly. In this instance, in order to maximize a transmittance of an incident light 310 of the panel, an interval between the plurality of external light shielding parts or a width of each of the plurality of external light shielding parts may be optimized.

The external light shielding pattern 236, that is, the external light shielding part includes a polymer resin and at least one color-changeable colorant.

The polymer resin may include any one of an acrylic resin, a silicon resin, a urethane resin, and the like.

The color-changeable colorant includes a thermochromic colorant whose color varies depending on an ambient temperature of the colorant, or a photochromic colorant whose color varies depending on an intensity of an external light source. Also, the color-changeable colorant includes a photochromic colorant whose color varies depending on a specific wavelength.

The color-changeable colorant includes at least one colorant selected from the group consisting of spiropyran-based colorants, thionine-based colorants, diarylethene-based colorants, and diazo-based colorants.

In particular, in the case of the thermochromic colorant, the discoloration temperature is preferably about 40° C. This is because the temperature of the PDP apparatus about 40° C. when the PDP apparatus is turned on, and less than 40° C. when the PDP apparatus is turned off. Specifically, in the case of the external light shielding film including the colorant having the discoloration temperature of about 40° C., a desired color may be visible even when the power of the PDP apparatus is off, thereby improving the effect of an interior decoration.

Also, when the external light shielding part includes the photochromic colorant, the photochromic colorant preferably has a color in a relatively bright external environment, and conversely, preferably has a transparent color in a relatively dark external environment.

As a result, the degree of light absorption varies effectively depending on external environmental condition, thereby improving a contrast ratio in a bright room. Also, in the relatively dark external environment, a transmittance of an image is increased.

An external light shielding film according to another exemplary embodiment of the present invention may use a colorant which is not returned to its inherent color by being reacted with a specific wavelength, as the photochromic colorant. In particular, it is preferable for a colorant in which a transparent color is exhibited before irradiating a light of a specific wavelength and a dark color is exhibited after irradiating a light of a specific wavelength to be used. When a light is irradiated to the colorant that is not transparent before the color is being changed, a transmittance of the light is deteriorated, thereby deteriorating a discoloration efficiency of the colorant. Also, when the colorant exhibits a relatively bright color after the color is changed, the external light shielding efficiency of the external light shielding film may be deteriorated.

The light of the specific wavelength causing discoloration of the photochromic colorant is preferably an ultraviolet ray. Accordingly, a colorant discolored by the ultraviolet ray and a diazo-based colorant may be used for the photochromic colorant.

In general, the photochromic colorant has characteristics such that when the photochromic colorant is irradiated with a light of a specific wavelength, the photochromic colorant is discolored. Conversely, when the photochromic colorant is not irradiated with the light of the specific wavelength for a predetermined time period, it is returned to its original color. According to the present exemplary embodiment of the invention, in order to prevent the photochromic colorant from being returned to the original color by being reacted with a specific wavelength, an ultraviolet initiator may be used in the photochromic colorant. An oxide-based compound, an azo-based compound, and the like, may be used as the ultraviolet initiator forming a radical by the ultraviolet ray.

Also, when the external light shielding pattern 236 has the wedge form in its cross-sectional shape as described above, optical effects due to the material consisting of the external light shielding pattern 236 as well as due to the shape of the same are effectively acquired.

The color-changeable colorant consisting of the external light shielding pattern 236 preferably contains about 0.1 to 100 parts by weight based on 100 parts by weight of a solid content of the polymer resin. Specifically, when the color-changeable colorant contains 0.1 parts by weight or less, the effect is relatively poor. Conversely, when the color-changeable colorant contains 100 parts by weight or more, the polymer resin fails to fix the color-changeable colorant, and thus the color-changeable colorant may leak from the polymer resin.

The color-changeable colorant preferably contains about 1 to 20 parts by weight based on 100 parts by weight of the solid content of the polymer resin.

As examples of the color-changeable colorant, a spiroxazine-based colorant may be used. A plurality of color-changeable colorants may be used, and the photochromic colorant and the thermochromic colorant may be simultaneously used.

Hereinafter, a method of manufacturing an external light shielding film according to an exemplary embodiment of the present invention will be described in detail with reference to FIG. 3.

Figure 3:
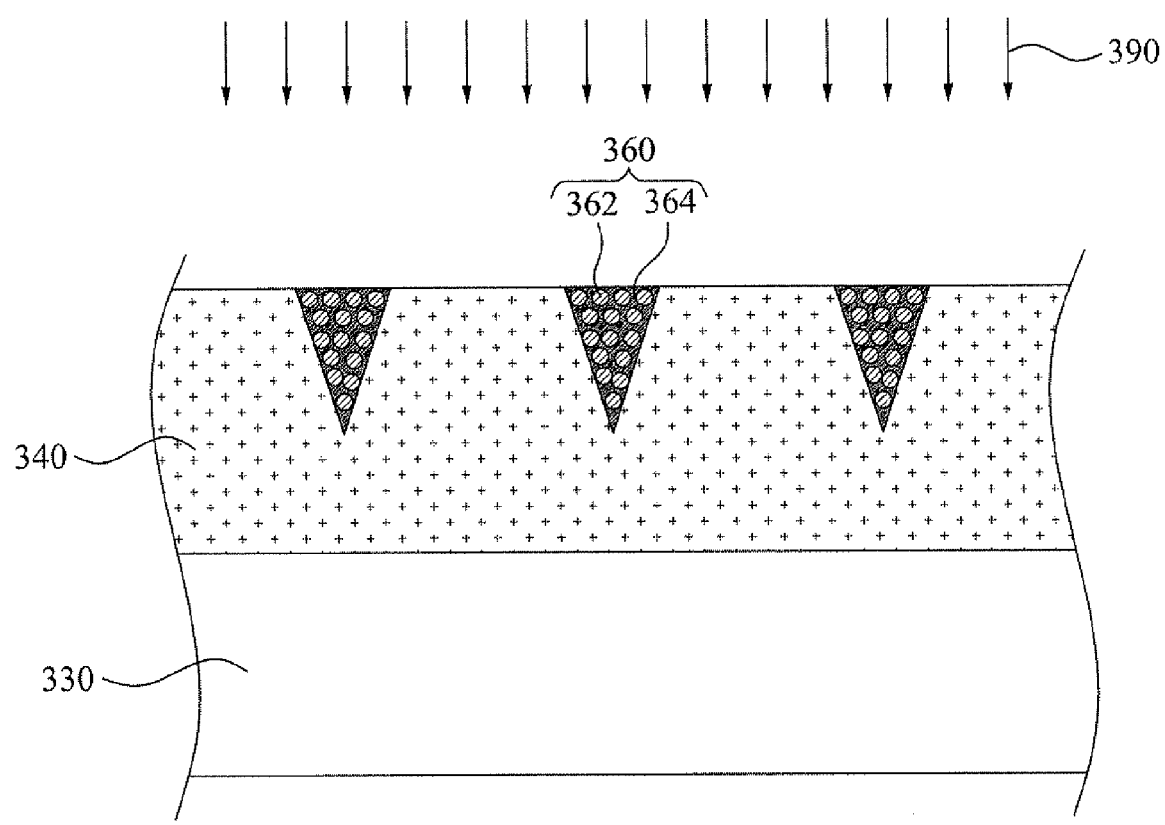
FIG. 3 is a schematic cross-sectional view illustrating an external light shielding film according to an exemplary embodiment of the present invention.

FIG. 3 is a schematic cross-sectional view illustrating an external light shielding film according to an exemplary embodiment of the present invention. The external light shielding film is disposed on a filter base 330, and includes a transparent substrate 340 which is provided with a plurality of wedge-shaped external light shielding parts 360 formed thereon. Each of the plurality of external light shielding parts 360 is filled with a resin 364 containing a carbon black 362 and a photochromic colorant. Each of the plurality of external light shielding parts 360 according to the present exemplary embodiment of the invention is formed in a wedge-shape, however, the present invention is not limited thereto. Thus, each of the plurality of external light shielding parts 360 may be formed in various shapes such as a trapezoidal shape, a rectangular shape, a semi-circular shape, and the like.

Predetermined shaped grooves are formed on a surface of the transparent resin substrate 340, a light absorbing substance and a resin including a photochromic colorant are injected to the inside of the grooves, and then the resin are hardened, thereby forming an external light shielding film.

As general methods of forming a pattern, a heat-press method in which a heated mold is pressurized on a thermoplastic resin, a casting method in which a thermoplastic resin composition is injected to an inside of a mold and solidified, an injecting molding method, a UV curing method in which an ultraviolet curable resin composition is injected to an inside of a molding frame and then hardened, and the like, may be listed. The pattern type may be formed in various shapes depending on the mold, and in general formed in a wedge shape. Colored particles such as a carbon black and a resin including a conductive substance are injected to the inside of the pattern formed on the transparent substrate by using a wiping method, and then are hardened.

When a colorant which is discolored into a relatively dark color or a black color due to radiation of a light of a wavelength in an ultraviolet range is used as the photochromic colorant, an ultraviolet curable resin film is preferably used for the substrate 340. Also, the photochromic colorant is required to be irreversibly changed into a black color by irradiation of an ultraviolet ray. Specifically, the photochromic colorant whose color is maintained after being discolored is required to be used.

The carbon black is generally used as the light absorbing substance. Also, a black substance is used as the light absorbing substance. When the carbon black is used as the light absorbing substance, a particle size of the carbon black is about 10 μm, and a width of each of the plurality of external light shielding parts 360 is about 30 to 40 μm. Thus, as illustrated in FIG. 3, the resin 364 including a photochromic colorant is injected between the carbon black particles 362. In this case, when an ultraviolet ray is irradiated to the resin 364, the photochromic colorant is discolored into a black color, so that the resin 364 injected between the carbon black particles in the inside of each of the plurality of external light shielding parts 360 is discolored into a black color.

Accordingly, the black substance is injected even between the carbon black particles 362, so that an external light shielding efficiency is increased, thereby improving a contrast ratio in a bright room.

As described above, according to the present invention, the external light shielding film may have variable optical effects due to the color-changeable colorant and due to the shape of the external light shielding pattern so that various applications of the external light shielding film can be expected.

Also, according to the present invention, the external light shielding film may be applied to a filter for a display apparatus, and the like, so that a color can vary depending upon ON/OFF of the power of the display apparatus, thereby achieving interior decorative effects as well as adjustable optical properties.

Also, the external light shielding film may be suitably used for varying environmental conditions.

Also a photochromic colorant which is discolored into a black color by a light of a specific wavelength and a light absorbing substance are injected to the pattern so that a content of the black substance is increased, thereby increasing an external light shielding efficiency.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An external light shielding film, comprising:
a transparent substrate; and
an external light shielding pattern formed on a surface of the transparent substrate and including a plurality of external light shielding parts,
wherein each of the plurality of external light shielding parts has a polymer resin and at least one color-changeable colorant.

2. The film of claim 1, wherein the polymer resin includes at least one of an acrylic-based resin, a silicon resin, and a urethane resin.

3. The film of claim 1, wherein the color-changeable colorant is a photochromic colorant whose color varies depending on a wavelength of an external light source.

4. The film of claim 3, wherein the color of the photochromic colorant varies depending on a wavelength of a light in an ultraviolet ray range.

5. The film of claim 3, wherein the photochromic colorant is irreversibly changed into a black color by irradiation of a light.

6. The film of claim 1, wherein the color-changeable colorant includes at least one colorant selected from the group consisting of spiropyran-based colorants, thionine-based colorants, diarylethene-based colorants, and diazo-based colorants.

7. The film of claim 1, wherein each of the plurality of external light shielding parts further includes a photochromic colorant and an ultraviolet initiator forming a radical by ultraviolet ray.

8. The film of claim 7, wherein the ultraviolet initiator includes at least one substance selected from an oxide-based compound and an azo-based compound.

9. The film of claim 1, wherein the color-changeable colorant is a thermochromic colorant whose color varies depending on an ambient temperature of the colorant.

10. The film of claim 1, wherein each of the plurality of external light shielding parts includes 0.1 to 100 parts by weight of a color-changeable colorant with respect to 100 parts by weight of a solid content of the polymer resin.

11. The film of claim 1, wherein each of the plurality of external light shielding parts has a wedge form in its cross-sectional shape, and a stripe form when viewed from the top.

12. The film of claim 1, further comprising:
a support body adhered to a surface of the substrate.

13. An optical filter for a display apparatus, comprising:
a plurality of functional films; and
an external light shielding film disposed between at least two adjacent functional films, the external light shielding film comprising:
a transparent substrate; and
an external light shielding pattern formed on a surface of the transparent substrate and including a plurality of external light shielding parts,
wherein each of the plurality of external light shielding parts has a polymer resin and at least one color-changeable colorant.

* * * * *